Dec. 25, 1951     A. LORENZ     2,579,502

RECLINING ARTICLE OF FURNITURE

Filed Jan. 31, 1946     6 Sheets-Sheet 1

INVENTOR
ANTON LORENZ
BY
HIS ATTORNEY

Dec. 25, 1951 — A. LORENZ — 2,579,502
RECLINING ARTICLE OF FURNITURE
Filed Jan. 31, 1946 — 6 Sheets-Sheet 2

INVENTOR
ANTON LORENZ
HIS ATTORNEY

Dec. 25, 1951  A. LORENZ  2,579,502
RECLINING ARTICLE OF FURNITURE
Filed Jan. 31, 1946  6 Sheets-Sheet 3

INVENTOR
ANTON LORENZ
BY

HIS ATTORNEY

Dec. 25, 1951     A. LORENZ     2,579,502
RECLINING ARTICLE OF FURNITURE Filed Jan. 31, 1946     6 Sheets-Sheet 4

INVENTOR
ANTON LORENZ
BY 
HIS ATTORNEY

Dec. 25, 1951          A. LORENZ          2,579,502

RECLINING ARTICLE OF FURNITURE

Filed Jan. 31, 1946          6 Sheets—Sheet 5

INVENTOR
ANTON LORENZ
BY

HIS ATTORNEY

Dec. 25, 1951     A. LORENZ     2,579,502

RECLINING ARTICLE OF FURNITURE

Filed Jan. 31, 1946     6 Sheets-Sheet 6

INVENTOR
ANTON LORENZ
BY 
HIS ATTORNEY

Patented Dec. 25, 1951

2,579,502

UNITED STATES PATENT OFFICE 2,579,502

RECLINING ARTICLE OF FURNITURE

Anton Lorenz, Buffalo, N. Y.

Application January 31, 1946, Serial No. 644,451

16 Claims. (Cl. 155—105)

1

The present invention relates to articles of furniture, and more particularly to a reclining article of furniture, wherein the seat and the back-rest are swingably mounted on a support.

An object of the present invention is to provide an article of furniture of above described type with a mechanism, simple in construction, for controlling the movements of the seat and back-rest in dependence on each other.

Another object of the present invention is to improve on the construction of articles of furniture of above described type as now ordinarily made.

With the above and other objects of the invention in view, the invention consists in the novel construction, arrangement and combination of various devices, elements and parts, as set forth in the claims hereof, certain embodiments of the same being described in the specification and being illustrated in the accompanying drawings forming part of this specification, wherein:

2

Figures 1, 2, 3, 4, 5, 6, 7:
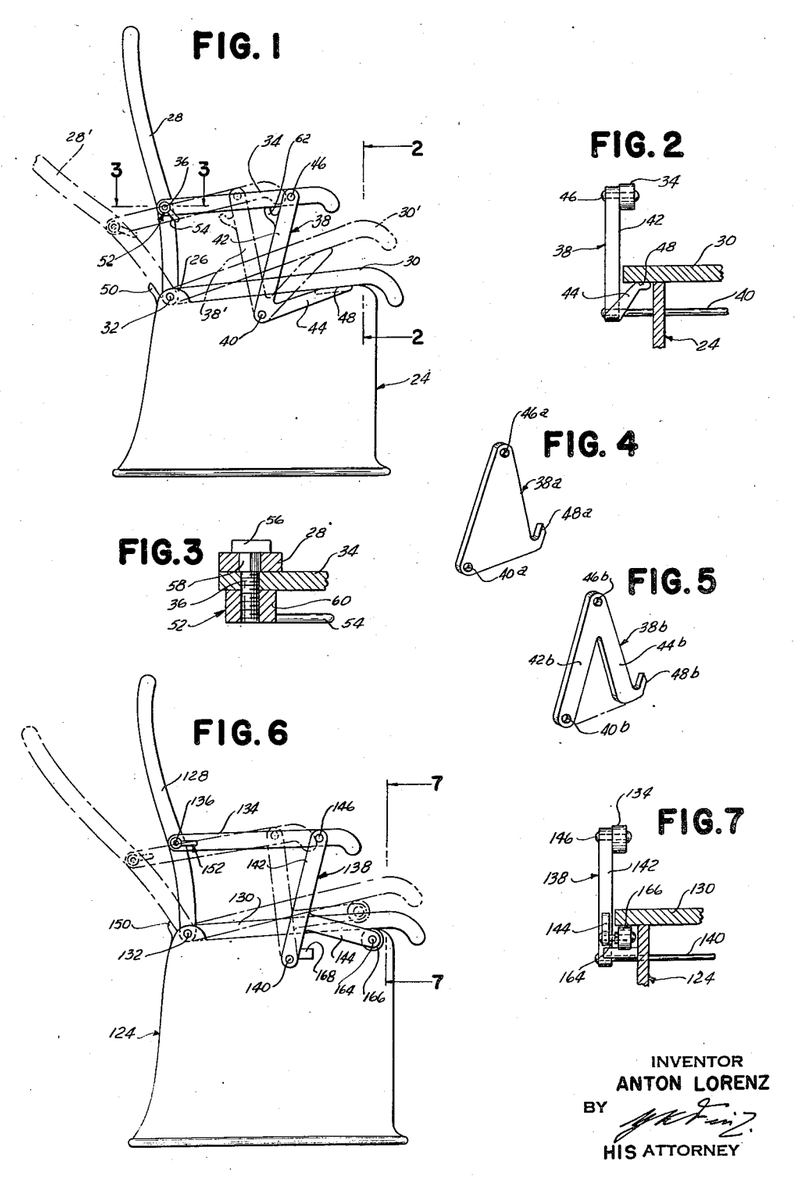
Fig. 1 is a side elevational view of a reclining chair according to the invention.
Fig. 2 is a fragmentary sectional view taken on line 2—2 of Fig. 1.
Fig. 3 is a sectional view taken on line 3—3 of Fig. 1.
Fig. 4 is a perspective view of a different embodiment of a controlling member which may be substituted for the controlling member of the reclining chair shown in Fig. 1.
Fig. 5 is a further embodiment of such a controlling member which may be substituted for the controlling member of the reclining chair shown in Fig. 1.
Fig. 6 is a side elevational view of a different embodiment of a reclining chair according to the invention.
Fig. 7 is a sectional view taken on line 7—7 of Fig. 6.

Referring now to Figs. 1 and 2, 24 generally indicates the support of a reclining chair. Said support 24 has a lug 26 on each side of the chair. The lower end of a back-rest 28 and the rear end of a seat 30 are pivoted to said lugs 26 at 32.

A connecting link 34 representing an arm-rest is arranged on each side of the chair above the plane of the seat 30. The rear end of each connecting link 34 is pivoted to an intermediate point of the back-rest 28 at 36. Furthermore, a controlling member generally indicated by 38 is arranged on each side of the chair. Said controlling members 38 are positively connected with a transverse rod 40 rotatably mounted in suitable bearings of the support 24 at a point spaced from the pivotal connection 32 between the back-rest 28 and the support 24. Each controlling member 38 comprises a controlling link 42 and a controlling arm 44 positively connected with each other, so that the controlling link 42 and the controlling arm perform simultaneous movements. According to the embodiment shown in Figs. 1 and 2, said controlling link 42 and controlling arm 44 are formed by an integral piece of material, however, if desired, the controlling link 42 and the controlling arm 44 could be made of two separate members rigidly connected with each other by suitable means, for example screws, at the lower end of the controlling link 42 adjacent the swingable mounting thereof in the support. The upper end of each controlling link 42 is pivoted to the connecting link 34 at 46. The controlling arm 44 is offset and has at its free end a controlling or abutting surface in the shape of a controlling cam 48 for shiftable and loose engagement with a cooperating abutting surface at the lower side of the seat 30.

When the seat 30 is in the sitting position shown in full lines in Figs. 1 and 2, the seat rests on the upper edge of the support 24, which, thus, forms a limiting means for limiting the sitting position of the seat.

When the occupant of the chair leans the weight of his body against the back-rest 28, he may swing the back-rest about its pivot 32 into a reclined position, for example into the extreme reclined position 28' shown in dash and dot lines, which is limited by an abutment of the back-rest against the stop 50 mounted on the support 24. During such a swinging movement of the back-rest 28, the controlling members 38 connected with the back-rest through the connecting links 34 are swung about their pivot 40 into the position 38', whereby the seat 30 slidably engaged with the controlling arms 44 of said controlling members 38 is lifted into the position 30'. On the other hand, if the occupant of the chair wishes to return from the reclined position into the sitting position and brings the weight of his body to act on the seat 30, the latter will return from the reclined position 30' into the sitting position 30, whereby the back-rest is returned from the position 28' into the position 28 through the mechanism including the swingable controlling members 38 and the connecting links 34. Thus, as will be readily understood, the movements of the back-rest and the seat are controlled in dependence on each other.

The back-rest and the seat may be held in any desired position, for example in above described extreme reclined position 28', 30', or in any other intermediate reclined position by means of a locking device generally indicated by 52 and arranged on a pivot 36 connecting a connecting link 34 with the back-rest 28. As best shown in Figs. 1 and 3, said locking device 52 comprises a handle 54 screwed on the threaded end of the pivot 36. Said pivot 36 has a head 56 resting against the surface of the back-rest 28. A square portion 58 of the pivot 36 is inserted into a corresponding square aperture of the back-rest 28, whereby the pivot 36 is prevented from rotation. When the user of the chair loosens the locking handle 54, the surface of the hub 60 of said handle is disengaged from the surface of the connecting link 34, so that the movable members of the chair may be freely moved from one position into another one. When the locking handle 54 is tightened, the surface of the hub of the handle is pressed against the connecting link 34, whereby the latter is pressed against the back-rest 28 engaged with the head 56 of the pivot 36, so that the members of the chair are held in their position. Of course, any other type of locking device may be used instead of said locking device 52, if desired.

As mentioned above, the abutting surface of the controlling cam 48 is in loose engagement with a cooperating abutting surface of the seat 30. When the handle 54 of the locking device 52 is loosened, and the user of the chair gets up from the chair by holding on to the arm-rests 34, the mechanism comprising the back-rest 28, the connecting links 34, and the controlling members 38 could collapse. In order to prevent said mechanism from collapsing in a forward direction, a stop 62 is arranged on the controlling link 42 of the controlling member 38 for abutting engagement with the connecting link 34 when the seat 30 is in the sitting position. Said stop preventing a collapsing of said mechanism permits a rearward movement of the movable members of the chair into a reclined position.

The controlling member 38 must not necessarily be in the shape shown in Figs. 1 and 2. Fig. 4, for example, illustrates a different embodiment of such a controlling member which could be used in the chair shown in Figs. 1 and 2 instead of the controlling member 38. According to Fig. 4 the controlling member 38a is in the shape of a plate having a bore 46a for a pivotal connection with the connecting link and having a bore 40a for connection with the transverse rod. Furthermore, a controlling element constituting an abutting surface 48a for slidable engagement with a cooperating abutting surface of the seat is integral or rigidly connected with said controlling plate 38a.

Fig. 5 illustrates another embodiment of a controlling member 38b which could be used in the chair shown in Figs. 1 and 2 instead of the controlling member 38. Said controlling member 38b being in the shape of an inverted V has a bore 46b for pivotal connection with the connecting link and a bore 40b for connection with the transverse rod. Moreover, said controlling member 38b is provided with a controlling or abutting surface 48b for slidable engagement with the lower surface of the seat. The controlling member 38b may also be considered as being composed of a controlling link 42b and a controlling arm 44b, one end of which is rigidly connected with the upper end of said controlling link 42b adjacent the pivotal connection thereof with the connecting link. The controlling member 38b shown in Fig. 5 may be obtained, for example, by cutting a V-shaped recess into a plate of the shape shown in Fig. 4. The lower edge of such a plate is indicated by dash lines in Fig. 5.

According to the embodiment of a reclining chair shown in Figs. 6 and 7, the back-rest 128 and the seat 130 are again coaxially swingably mounted at the point 132 of the support 124. The rear end of each connecting link 134 is pivoted to the back-rest 128 at 136. The front end of each connecting link 134 is pivoted to the controlling member 138 at 146. Each controlling member 138 comprises a controlling link 142 rigidly connected at its lower portion with a transverse rod 140 for swingable mounting on the support 124 at a point spaced from the pivotal connection 132 between the back-rest 128 and the support 124. One end of a controlling arm 144 is rigidly connected with an intermediate point of the controlling link 142. Said controlling arm 144 is in the same plane as the controlling link 142. A shaft 164 mounted at the free end of the controlling arm 144 projects therefrom towards the center of the chair and carries a roller 166. Said roller 166 is rotatably and axially immovably arranged on said shaft 164. The controlling or abutting surface of the controlling member 138 is constituted by the circumferential surface of the roller 166 being in loose engagement with a cooperating abutting surface of the lower surface of the seat 130.

When the back-rest 128 is swung about the pivot 132 into a reclined position, the controlling member 138 connected with the back-rest through the connecting link 134 is rocked about the pivot 140, whereby the roller 166 rolling along the lower surface of the seat 130 lifts the latter into a reclined position.

The sitting position of the seat 130 is limited by the upper edge of the support 124, and the reclined position of the movable members of the chair is limited by the stop 150 mounted on the support. The movable members of the chair may be held in any desired position by means of the locking device 152.

A stop 168 mounted on the support 124 for abutting engagement with the controlling link 142 when the seat is in the sitting position prevents the mechanism 128, 134, 138 for collapsing.

Figure 8:
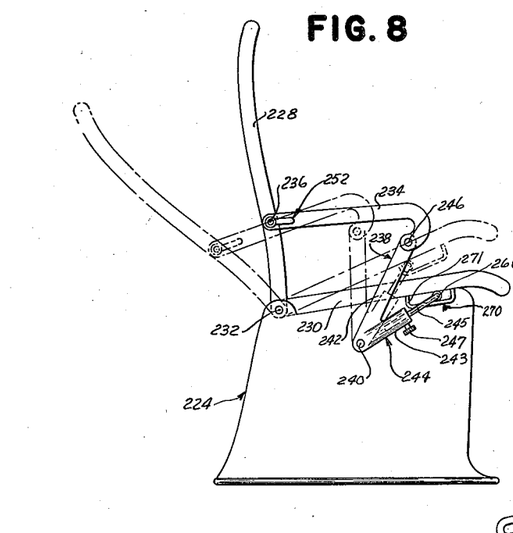
Fig. 8 is a side elevational view of a further embodiment of a reclining chair according to the invention.

According to the embodiment of a reclining chair shown in Fig. 8 the back-rest 228 and seat 230 are pivoted to the support 224 at 232. The rear end of each connecting link 234 is pivoted to the back-rest 228 at 236, the front end of each connecting link 234 is pivoted to a controlling member 238 at 246. Each of said controlling members 238 is swingably mounted on the support 224 at 240. Each of said controlling members 238 comprises a controlling link 242 and an arm 244 rigidly connected with each other. Said arm 244 is in the shape of a telescopic member having a hollow portion 243 slidably receiving a rod 245. The rod 245 may be held in any predetermined position by means of a set screw 247. The rod 245 carries a roller 266 in loose engagement with the lower surface of the seat 230.

Again the movements of the back-rest 228 and the seat 230 are controlled in dependence on each other by means of the mechanism 234, 238. The movable members of the chair may be held in any desired position by means of the locking device 252.

A bracket 270 mounted on the lower surface of the seat 230 and in engagement with the roller 266 prevents a collapsing of the mechanism 228, 234, 238 when the seat 230 is in the sitting position. Furthermore, the left-hand portion 271 of said bracket 270 serves to limit the extreme reclined position shown in dash and dot lines by engagement with the roller 266.

Above described telescopic arm 244 permits a variation and adjustment of the distances between the pivots 240 and 246 and the roller 266 for varying and adjusting the initial angle between the back-rest 228 and seat 230.

Figure 9:
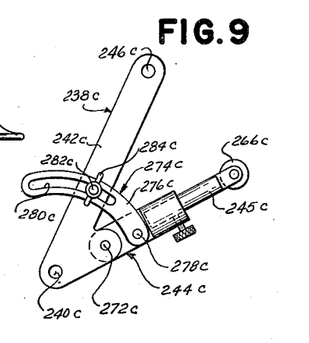
Fig. 9 is a view of a controlling member which may be substituted for the controlling member of the reclining chair shown in Fig. 8.

Fig. 9 illustrates a different embodiment of a controlling member 238c which could be used in the chair shown in Fig. 8 instead of the controlling member 238. According to Fig. 9, the telescopic controlling arm 244c is swingably mounted on the controlling link 242c at 272c. The telescopic controlling arm 244c including the rod 245c carrying the roller 266c may be held at a predetermined position relative to the controlling link 242c by means of a locking device generally indicated by 274c. Said locking device 274c comprises a member 276c swingably mounted on the controlling arm 244c at 278c and having a slot 280c. A bolt 282c mounted on the controlling link 242c is slidably engaged with said slot 280c. A wing nut 284c is screwed on the threaded end of said bolt 282c for pressing the member 276c against the controlling link 242c so as to hold the controlling arm 244c at a predetermined angle relative to the controlling link 242c. The controlling link 242c is provided with a bore 246c for pivotal engagement with the connecting link and is further provided with a bore 240c for pivotal engagement with the support. As will be readily understood, the adjustable controlling member 238c shown in Fig. 9 permits a still greater variety of adjustments of the distance between the bore 246c and the roller 266c.

Figure 10:
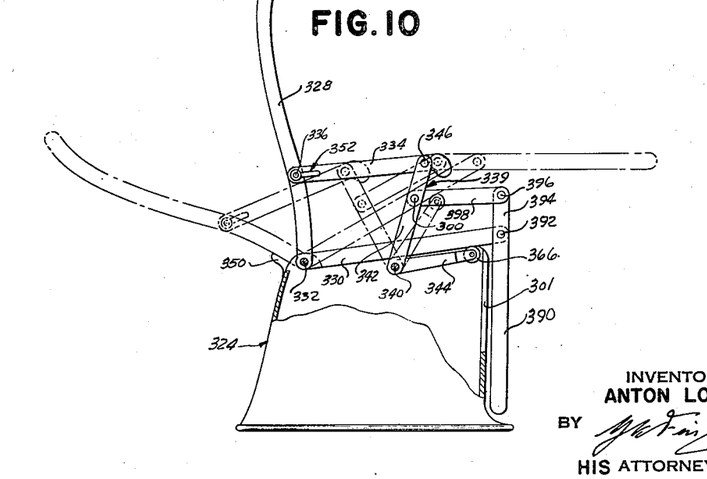
Fig. 10 is a side elevational view of another embodiment of a reclining chair according to the invention, a portion of the side wall being broken away.
Figures 11, 12, 13:
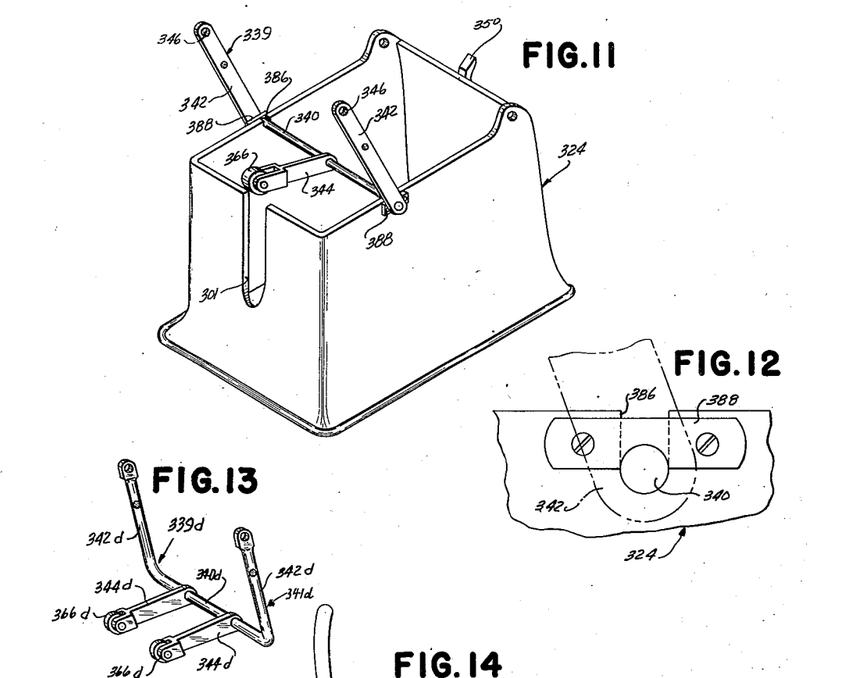
Fig. 11 is a perspective view of the support of the reclining chair shown in Fig. 10, the controlling unit of said chair being shown mounted in the support.
Fig. 12 is a fragmentary view illustrating a safety device for holding the controlling unit of the chair shown in Fig. 10 in its position.
Fig. 13 is a perspective view of a different embodiment of a controlling unit which may be substituted for the controlling unit shown in Fig. 11.

According to the embodiment of a reclining chair illustrated by Figs. 10–12, the back-rest 328 and seat 330 are pivoted to the support 324 at 332. Again, a connecting link 334 arranged on each side of the chair is pivoted to the back-rest 328 at 336. Each connecting link 334 is pivoted at 346 to a controlling unit generally indicated by 339. The controlling unit 339 swingably mounted on the support 324 comprises the following members: a transverse rod 340 swingably arranged in the support 324 in a manner to be described hereinafter, two controlling links 342, one on each side of the chair, and each of them rigidly connected with the transverse rod 340 at its lower end, and a controlling arm 344, rigidly connected with said transverse rod 340 and provided with a roller 366.

As best shown in Figs. 11 and 12, the transverse rod 340 of said controlling unit 339 is rotatably arranged in recesses 386 of the side walls of the support 324. Said recesses 386 are open at the top and the transverse rod 340 is held in its position by means of safety members 388 attached to the side walls of the support 324 by screws. Thus, the controlling unit 339 may be readily mounted on the support 324 by inserting the transverse rod 340 of said controlling unit from above into the recesses 386 open at the top, whereupon the safety members 388 are attached to the support 324 for holding the controlling unit in its place. When the members of the chair are mounted on the support, the roller 366 is in loose engagement with the lower surface of the seat 330.

The chair shown in Fig. 10 is equipped with a leg-rest 390 swingably mounted on the seat 330 at 392. Said leg-rest 390 has an extension 394 pivotally connected at 396 with one end of a controlling bar 398, the other end of which is pivoted to the controlling link 342 at 300.

When the back-rest 328 is swung about its pivot 332 into its reclined position the controlling unit 339 connected with the back-rest through the connecting links 334 is swung about its pivot 340, whereby the seat 330 is lifted by means of the roller 366 rolling along the surface of the seat. Furthermore, said swinging movement of the controlling unit 339 causes a swinging movement of the leg-rest 390 about the pivot 392 by means of the controlling bar 398 connected with the controlling link 342 and the extension 394 of the leg-rest 390.

The sitting position of the movable members of the chair shown in full lines is limited by the upper edge of the support 324 contacting the seat 330. The extreme reclined position of the movable members of the chair shown in dash and dot lines is limited by the stop 350 contacting the back-rest. A collapsing of the mechanism 328, 334, 339 when the seat 330 is in the sitting position is prevented by an engagement of the leg-rest 390 with the front wall of the support 324.

The movable members of the chair may be held in any desired position by means of the locking device 352.

Fig. 13 illustrates a different embodiment of a controlling unit 339d which may be used in the chair shown in Figs. 10 and 11 instead of the controlling unit 339. According to Fig. 13 the controlling unit 339d comprises a U-shaped member 341d. The base of said U-shaped member 341d forms a transverse rod 340d for swingable mounting in the support, and the two arms of said U-shaped member 341d form the controlling links 342d for pivotal connection with the connecting link. Two arms 344d are rigidly secured to the base of the U-shaped member 341d. Each arm carries a roller 366d for engagement with the seat.

Figure 14:
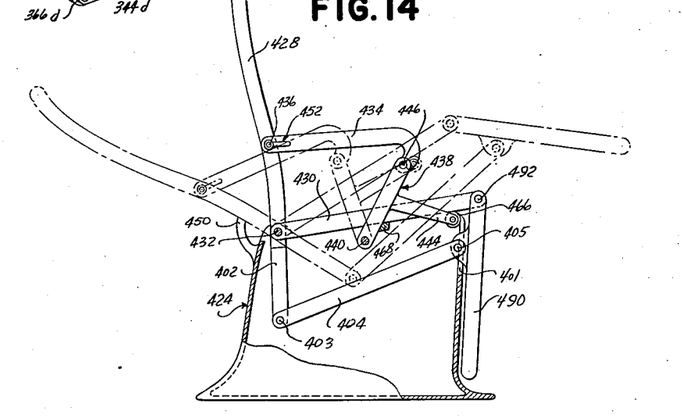
Fig. 14 is a side elevational view of a different embodiment of a reclining chair according to the invention, a portion of the side wall being broken away.

According to the embodiment of a reclining chair shown in Fig. 14, the back-rest 428 and the seat 430 are pivoted to the support 424 at 432. On each side of the chair the rear end of a connecting link 434 is pivoted to the back-rest 428 at 436. Each connecting link 434 is pivotally connected at 446 with a controlling member 438 arranged on each side of the chair. The controlling members 438 carrying a roller 466 at their controlling arm 444 for loose engagement with the seat 430 are swingably mounted on the support 424 at 440.

A leg-rest 490 is swingably mounted on the seat 430 at 492. The back-rest 428 has an extension 402 in the center of the chair. One end of a controlling bar 404 is pivotally connected with said extension 402 of the back-rest 428 at 403, and the other end of said controlling bar 404 is pivoted to a lug of the leg-rest 490 at 405. The controlling bar 404 may pass through a slot 401 in the front wall of the support 424. (Fig. 11 illustrates a similar slot 301 of the support 324.)

When the back-rest 428 is swung about its pivot 432 into a reclined position, the seat 430 is lifted by the rollers 466 of the controlling members 438 connected with the back-rest 428 by the connecting link 434. At the same time, the leg-rest 490 is swung about its pivot 492 by means of the controlling bar 404 connected with the extension 402 of the back-rest 428.

The sitting position of the members of the chair shown in full lines is limited by an abutment of the seat 430 against the upper edge of the support 424, and the extreme reclined position of the members of the chair shown in dash and dot lines is limited by the stop 450 cooperating with the back-rest.

The movable members of the chair may be held in any desired position by the locking device 452.

A stop 468 is mounted on the support 424 in such a manner, that the controlling member 438 abuts against said stop when the seat 430 is in the sitting position, whereby an undesired collapsing of the mechanism 428, 434, 438 is eliminated.

Figure 15:
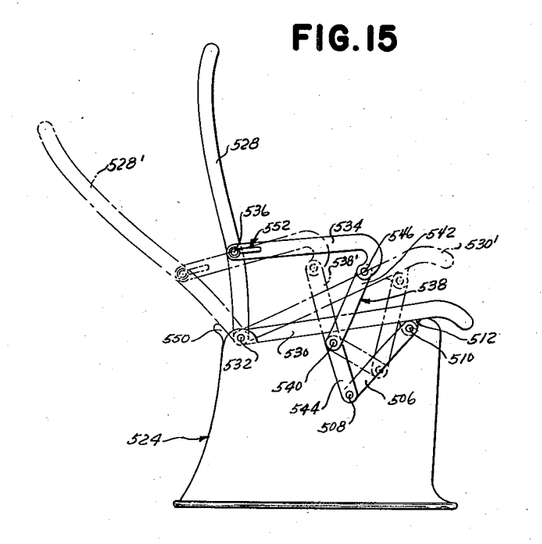
Fig. 15 is a side elevational view of still another embodiment of a reclining chair according to the invention.

Fig. 15 illustrates a different embodiment of a reclining chair, wherein again the back-rest 528 and the seat 530 are pivoted to the support 524 at 532, and wherein again, on each side of the chair, the rear end of the connecting link 534 is pivoted to the back-rest 528 at 536. Furthermore, again, a controlling member 538 comprising a controlling link 542 and a controlling arm 544 rigidly connected with each other is swingably mounted at 540 on each side of the chair. Said controlling arm 544, however, is not in slidable engagement with the seat, but one end of a controlling rod 506 is pivoted at 508 to the arm 544 of the controlling member 538 at a point spaced from the pivotal connection 546 between the guiding link 542 of the controlling member 538 and the connecting link 534, and the other end of said controlling rod 506 is pivoted at 510 to a lug 512 mounted on the seat 530.

The seat 530 is held in the full line sitting position by abutment against the upper edge of the support 524. When the back-rest 528 is swung from the full line sitting position about its pivot 532 into a reclined position, for example the extreme reclined position 528' shown in dash and dot lines and limited by the stop 550, the controlling members 538 connected with the back-rest by the connecting links 534 are swung into the position 538', whereby the controlling arms 544 of said controlling members 538 lift the seat into the position 530' by means of the controlling rods 506 connecting the controlling arms 544 with the seat. When the seat is returned from the reclined position 530' into the sitting position 530, the back-rest is automatically moved from the reclined position 528' into the sitting position 528 by means of the mechanism 506, 538, 534.

Owing to the connection of the controlling member 538 with the seat 530 by means of the controlling rod 506, the mechanism 528, 534, 538 cannot collapse when the seat 530 is held in the sitting position by means of the upper edge of the support 524.

The movable members of the chair may be held in any desired position by means of the locking device 552.

Figure 16:
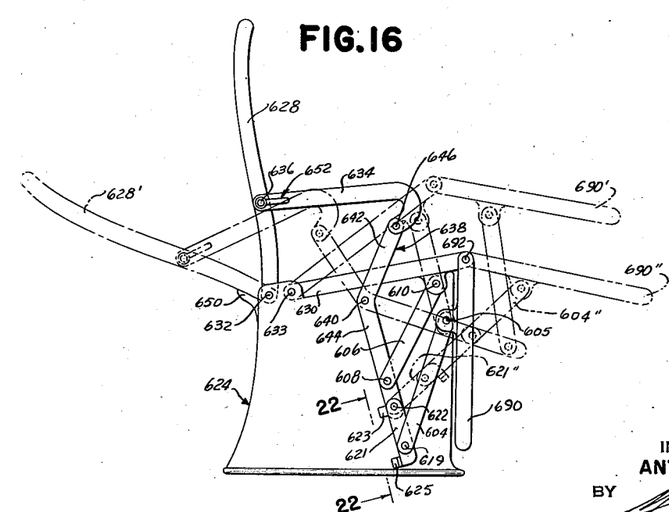
Fig. 16 is a side elevational view of a further embodiment of a reclining chair according to the invention.

According to Fig. 16 the back-rest 628 is pivoted to the support 624 at 632. The seat 630 is pivoted to the support 624 at 633 at a point spaced from the pivot 632 of the back-rest. Each of the controlling members 638 swingably mounted at 640 on each side of the chair comprises a controlling link 642 and a controlling arm 644 integral with each other. The controlling arm 644 is pivoted at 608 to one end of a controlling rod 606, the other end of which is pivoted to the seat 630 at 610. The upper end of the controlling link 642 is pivoted at 646 to the front end of the connecting link 634, the other end of which is pivoted at 636 to the back-rest 628.

Figure 22:
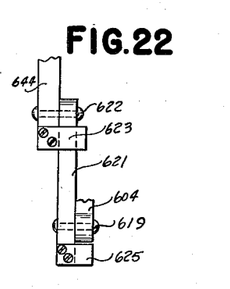
Fig. 22 is a view of a detail of the chair shown in Fig. 16, taken along line 22—22 of Fig. 16.

A leg-rest 690 swingably mounted on the seat 630 at 692 is pivoted at 695 to one end of a controlling bar 604. The other end of said controlling bar 604 is pivoted at 619 to one end of an adjusting element or bar 621 (see Figs. 16 and 22), the other end of which is swingably mounted on the controlling arm 644 at 622. A stop 623 secured to the controlling arm 644 by screws is arranged for engagement with the swingable adjusting bar 621, so as to hold same in alignment with the controlling arm 644 as shown in full lines in Fig. 16.

When the back-rest 628 is swung about its pivot 632 into the extreme reclined position 628' shown in dash and dot lines and limited by the stop 650, above described mechanisms cause a movement of the other movable members of the chair into the positions likewise shown in dash and dot lines, i. e. the seat and leg-rest are brought into the position 630' and 690'.

The movable members of the chair may be held in any desired position by means of the locking device 652.

As mentioned above, the adjusting bar 621 is swingable about the pivot 622. If the back-rest and seat are held in a predetermined position, for example the sitting position shown in full lines in Fig. 16, by means of the locking device 652, the leg-rest 690 may be swung by hand about its pivot 692 into the position 690'', wherein the controlling bar and the adjusting bar are in the positions 604'' and 621'' in alignment with each other. Now, when a slight pressure is exerted on the leg-rest, for example by the legs of the occupant resting in the chair, the controlling bar and the adjusting bar are moved slightly beyond said straight line, until a stop 625 secured to the adjusting bar 621 by screws abuts against the controlling bar, whereby said elements are locked and held in a predetermined position relative to each other.

Figure 17:
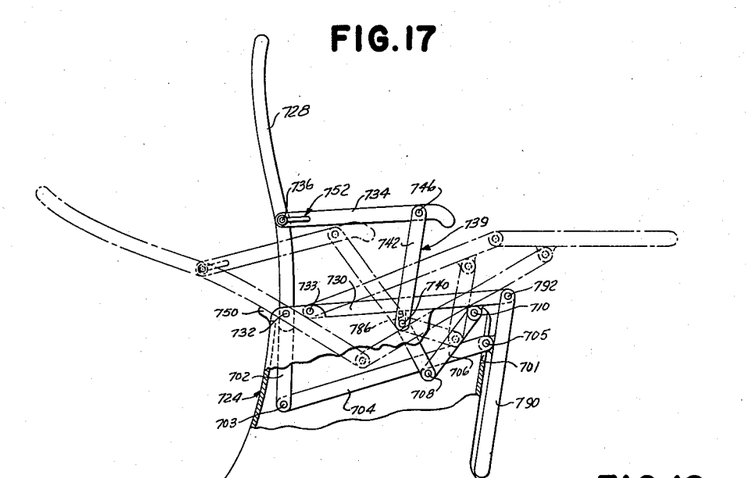
Fig. 17 is a side elevational view of another embodiment of a reclining chair according to the invention, a portion of the side wall being broken away.
Figure 18:
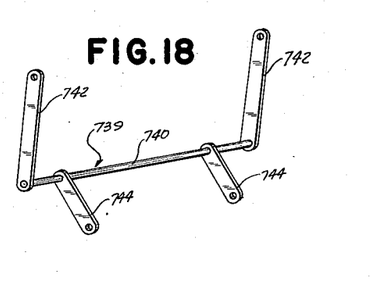
Fig. 18 is a perspective view of the controlling unit of the chair shown in Fig. 17.

According to the embodiment of a chair shown in Figs. 17 and 18, the back-rest 728 is pivoted to the support 724 at 732. The rear end of the seat 730 held in its sitting position by the upper edge of the support 724 is pivoted to the latter at 733 at a point spaced from the pivotal connection 732 between the back-rest 728 and the support 724. The support 724 is provided with recesses 786 open at the top for receiving the transverse rod 740 of a controlling unit generally indicated by 739. Said controlling unit 739 thus swingably mounted in the recesses 786 of the support 724 comprises a controlling link 742 on each side of the chair rigidly secured to said transverse rod 740. Furthermore, said controlling unit 739 includes two controlling arms 744 rigidly secured to said transverse rod 740. Each of said controlling arms 744 is pivoted at 708 to one end of a controlling rod 706, the other end of which is pivoted at 710 to the seat 730. The upper end of each controlling link 742 of the controlling unit 739 is pivoted at 746 to the front end of the connecting link 734, the rear end of which is pivoted to the back-rest 728 at 736.

The leg-rest 790 swingably mounted on the seat 730 at 792 is pivoted at 705 to one end of a controlling bar 704, the other end of which is pivoted at 703 to an extension 702 of the back-rest 728. The controlling bar 704 may pass through a slot 701 in the front wall of the casing-like support 724.

The sitting position of the movable members is shown in full lines, and the extreme reclined position limited by the stop 750 is shown in dash and dot lines. The movable members of the chair may be held in any desired position by means of the locking device 752.

Figure 19:
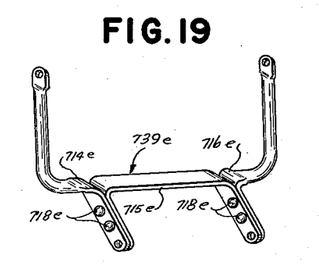
Fig. 19 is a perspective view of a different embodiment of a controlling unit which may be substituted for the controlling unit of the chair shown in Fig. 17.

Fig. 19 illustrates a different embodiment of a controlling unit which may be substituted for the controlling unit 739 of the chair shown in Figs. 17 and 18. According to Fig. 19 the controlling unit 739e is composed of three members 714e, 715e, 716e rigidly connected with each other by means of rivets 718e. The members 714e, 715e, 716e are arranged and shaped in such a manner, that they form two controlling links for pivotal connection with the connecting links and two controlling arms for pivotal connection with the controlling rods.

Figure 20:
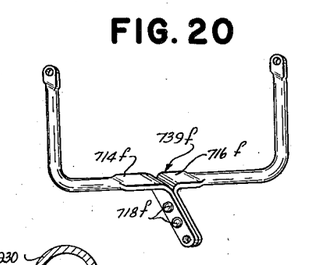
Fig. 20 is a perspective view of another embodiment of a controlling unit, which may be substituted for the controlling unit of the chair shown in Fig. 17.

Fig. 20 illustrates a further embodiment of a controlling unit which could be used in the mechanism of the chair shown in Figs. 17 and 18. According to Fig. 20, the controlling unit 739f is composed of two members 714f and 716f rigidly connected with each other by means of rivets 718f. Said members are arranged and shaped in such a manner, that they form two controlling links and a single controlling arm. Of course, when the controlling unit 739f is used, the seat is controlled by a single controlling rod pivotally connected with said single controlling arm and the seat.

Figure 21:
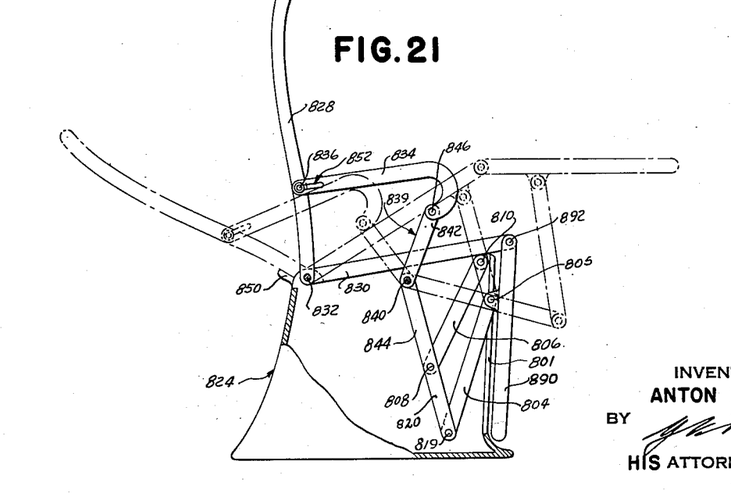
Fig. 21 is a side elevational view of another embodiment of a reclining chair according to the invention, a portion of the side wall being broken away.

Fig. 21 illustrates a different embodiment of a reclining chair according to the invention. The back-rest 828 and the seat 830 are pivoted to the support 824 at 832. On each side of the chair, a controlling link 842 is secured to a transverse rod 840 rotatably mounted in the support 824. One end of a controlling arm 844 arranged in the center of the chair is rigidly secured to said transverse rod 840 for simultaneous movements with said controlling links 842. One end of a controlling rod 806 is pivoted to said controlling arm 844 at 808, the other end of said controlling rod 806 is pivoted to the seat 830 at 810. The upper end of each controlling link 842 is pivoted to a connecting link 834 at 846. The other end of each connecting link 834 is pivoted to the back-rest 826 at 836.

A leg-rest 890 swingably mounted at 892 on the seat 830 is pivotally connected at 805 with one end of a controlling bar 804. The other end of said controlling bar 804 is pivoted at 819 to an extension 820 of the controlling arm 844. Thus, the controlling arm 844 controls the movements of the seat 830 by means of the controlling rod 806 and further controls the movements of the leg-rest 890 by means of the extension 820 and controlling bar 804. The controlling bar 804 may pass through a slot 801 in the front wall of the support 824. The controlling links 842, the transverse rod 840, and the controlling arm 844 rigidly connected with each other form a controlling unit 839 swingably mounted on the support 824.

The sitting position of the movable members is shown in full lines, and the extreme reclined position of the movable members limited by the stop 850 is shown in dash and dot lines. The movable members of the chair may be held in any desired position by means of the locking device 852.

Figure 23:
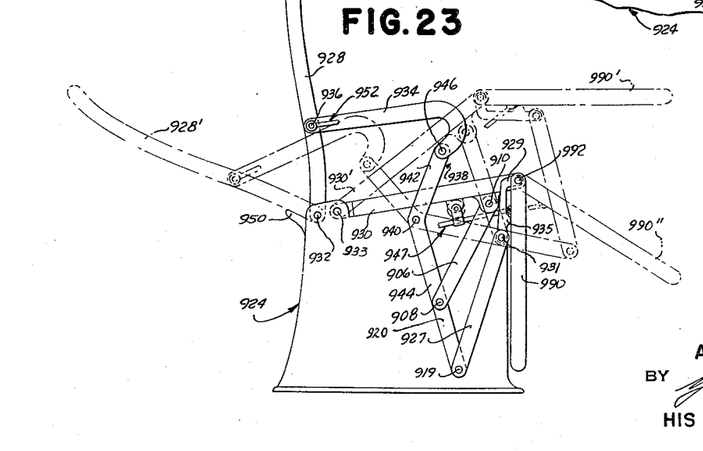
Fig. 23 is a side elevational view of a different embodiment of a reclining chair according to the invention.

According to the embodiment of a reclining chair shown in Fig. 23, the back-rest 928 is pivoted to the support 924 at 932. The rear portion of the seat 930 is pivoted to the support at 933 at a point spaced from the pivotal connection 932 between the back-rest 928 and the support 924. Each of the two controlling members 939 pivoted at 940 to the support at a point spaced from the pivotal connection 932 between the back-rest 928 and the support 924 comprises a controlling link 942 and a controlling arm 944 integral with each other. The controlling arm 944 is pivoted at 908 to one end of a controlling rod 906, the other end of which is pivoted to the seat 930 at 910. The upper end of the controlling link 942 is pivoted at 946 to the front end of the connecting link 934, the other end of which is pivoted at 936 to the back-rest 928.

A leg-rest 990 is swingably mounted on the seat 930 at 992. One end of a first controlling bar 927 is pivoted to an extension 920 of the controlling arm 944 at 919. The other end of said first controlling bar is pivoted to one end of a second controlling bar 929 at 931. The other end of said second controlling bar 929 is pivoted to the seat 930 at the pivot point 992 between the seat and the leg-rest. The second controlling bar 929 is provided with a controlling surface 935 of cam-like shape (see Figs. 23 and 24). Said controlling surface 935 is arranged for loose contact with the leg-rest 990, which may be held against said controlling surface by means of a spring (not shown). When the leg-rest is in contact with said controlling cam surface 935, the movements of the leg-rest are controlled by the controlling link 942 through the medium of the controlling arm 944, the controlling bar mechanism 927, 929, and the controlling surface 935. Thus, when the back-rest 923 is swung about its pivot 932, the back-rest and the seat may be swung into the reclined position 928', 930', and the leg-rest will be brought into the position 990', shown in dash and dot lines.

The sitting position shown in full lines is limited by the upper edge of the support 924, and the extreme reclined position shown in dash and dot lines is limited by the stop 950 of the support.

The movable members of the chair may be held in any desired position by means of the locking device 952.

Figure 24:
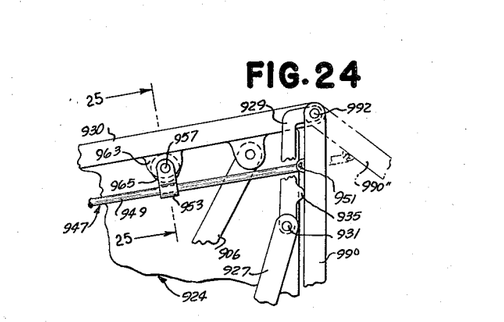
Fig. 24 is a fragmentary view of the front portion of the chair shown in Fig. 23, in an enlarged scale.
Figure 25:
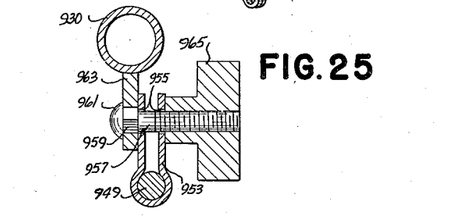
Fig. 25 is a sectional view taken on line 25—25 of Fig. 24.

If desired, the leg-rest 990 may be moved independently of the second controlling bar 929 relative to the seat 930, as the leg-rest 990 is in loose engagement with the controlling surface 935. For example, the leg-rest 990 may be brought into the position 990'', while the other members of the chair remain in the position shown in full lines. The leg-rest may be held in said position 990'' by means of a holding device, generally indicated by 947. As best shown in Figs. 24 and 25, said holding device 947 comprises a rod 949 swingably mounted on the leg-rest 990 at 951. Said rod 949 is slidably engaged with a clamping sleeve 953 having bores 955 in engagement with a screw-threaded bolt 957. A square portion 959 of said bolt 957 resting with its head 961 against the surface of a lug 963 mounted on the seat 930 is engaged with a corresponding square aperture of said lug 963, whereby the bolt 957 is prevented from rotation when an adjusting knob 965 screwed on the threaded end of said bolt is turned. When the adjusting knob 965 is loosened, the rod 949 may slide in the clamping sleeve 953, so that the leg-rest 990 may be swung by hand into a desired position, for example into the position 990''. Upon a tightening of the adjusting knob 965, the clamping sleeve 953 is tightened on the rod 949 for holding same and the leg-rest in its position. When the movable members of the chair are brought from the sitting position into a reclined position, the leg-rest will remain in the adjusted position (for example the position 990'') relative to the seat, until the controlling cam 935 of the second controlling bar 929 abuts against the leg-rest. If the movement of the movable members of the chair shall be continued, the adjusting knob 965 should be loosened, so that the controlling cam 935 now abutting against the leg-rest may swing same about its pivot 992 during a further movement of the movable members of the chair.

Figure 26:
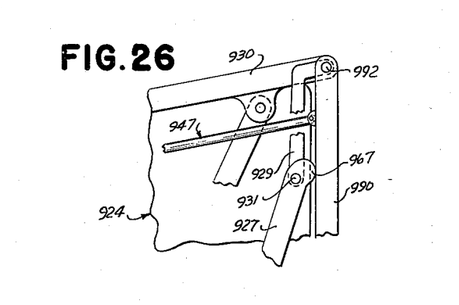
Fig. 26 is a fragmentary side elevational view of the front portion of a chair illustrating a different control of the leg-rest.

Fig. 26 illustrates a different embodiment of a control of the leg-rest 990, which may be substituted for the leg-rest control shown in Figs. 23 and 24. According to Fig. 26, the first controlling bar 927 pivoted at 931 to the second controlling bar 929 is provided with a cam-like controlling surface 967 in loose contact with the leg-rest pivoted to the seat 930 at 992 for controlling the movements of the leg-rest. Of course, the leg-rest 990 may be disengaged from said controlling surface 967 and may be held in any desired position relative to the seat 930 by the holding device 947.

It is understood, that certain parts, elements, or mechanisms shown in a certain figure, may be substituted for corresponding parts, elements, or mechanisms of the embodiments shown in other figures of the drawings.

I have described preferred embodiments of my invention, but it is understood that this disclosure is for the purpose of illustration, and that various omissions or changes in shape, proportion, and arrangement of parts, as well as the substitution of equivalent elements for those, herein shown and described may be made without departing from the spirit and scope of the invention as set forth in the appended claims. It is further understood, that the invention may be applied to other types of articles of furniture than the reclining chairs shown in the drawings; for example, the invention may be applied to garden chairs, lounges, chairs for use in airplanes or railroads, etc.

What I claim is:

1. A reclining article of furniture comprising: a support, a back-rest pivotally mounted on said support, a seat, the rear portion of said seat being swingably mounted on said support, a controlling link, said controlling link being swingably mounted on said support at a point spaced from the pivotal connection between the back-rest and the support and extending upwardly from its pivotal connection with said support, a connecting link, said connecting link being pivoted at its rear end to an intermediate point of said back-rest above the pivotal connection between the back-rest and the support and being pivoted at its front portion to the upper end of said controlling link, a controlling arm extending forwardly, the rear end of said controlling arm being fixedly connected with said controlling link, and means positioned between the front end of said controlling arm and said seat to effect movement of said seat in coordination with said controlling arm.

2. A reclining article of furniture comprising: a support, a back-rest pivotally mounted on said support, a seat, the rear portion of said seat being swingably mounted on said support, a controlling member, said controlling member being swingably mounted on said support at a point spaced from the pivotal connection between the back-rest and the support and extending upwardly from its pivotal connection with said support, and a connecting link, said connecting link being pivoted at its rear end to an intermediate point of said back-rest above the pivotal connection between the back-rest and the support and being pivoted at its front portion to the upper end of said controlling member, said controlling member having a forward extension, and means positioned between the forward extension of said controlling member and said seat to effect movement of said seat in coordination with said controlling member.

3. A reclining article of furniture comprising: a support, a back-rest pivotally mounted on said support, a seat, the rear portion of said seat being swingably mounted on said support, a controlling link, said controlling link being swingably mounted on said support at a point spaced from the pivotal connection between the back-rest and the support and extending upwardly from its pivotal connection with said support, a connecting link, said connecting link being pivoted at its rear end to an intermediate point of said back-rest above the pivotal connection between the back-rest and the support and being pivoted at its front portion to the upper end of said controlling link, a controlling arm extending forwardly, the rear end of said controlling arm being swingably connected with said controlling link, adjusting means associated with said controlling arm for adjusting and holding same in a predetermined position relative to said controlling link, and means positioned between the front end of said controlling arm and said seat to effect movement of said seat in coordination with said controlling arm.

4. A reclining article of furniture comprising: a support, a back-rest pivotally mounted on said support, a seat, the rear portion of said seat being swingably mounted on said support, a controlling member, said controlling member being swingably mounted on said support at a point spaced from the pivotal connection between the back-rest and the support and extending upwardly from its pivotal connection with said support, a connecting link, said connecting link being pivoted at its rear end to an intermediate point of said back-rest and being pivoted at its front portion to the upper end of said controlling member, said controlling member having a forward extension, and cooperating abutting surfaces arranged on the forward extension of said controlling member and on said seat whereby the movements of the seat are controlled in dependence on movements of the back-rest, said cooperating abutting surfaces being displaceable relative to each other.

5. A reclining article of furniture comprising: a support, a back-rest pivotally mounted on said support, a seat, the rear portion of said seat being swingably mounted on said support, a controlling member, said controlling member being swingably mounted on said support at a point spaced from the pivotal connection between the back-rest and the support and extending upwardly from its pivotal connection with the support, a connecting link, said connecting link being pivoted at its rear end to an intermediate point of said back-rest and being pivoted at its front portion to the upper end of said controlling member, said controlling member having a forward extension, cooperating abutting surfaces arranged on the forward extension of said controlling member and on said seat whereby the movements of the seat are controlled in dependence on movements of the back-rest, said cooperating abutting surfaces being displaceable relative to each other, limiting means arranged on the support for limiting the sitting position of the seat, and cooperating stopping means arranged on one of the elements of the mechanism including the back-rest, the connecting link and the controlling member and on an element adjacent to the element carrying one of said cooperating stopping means so as to prevent the elements of said mechanism from collapsing when the seat is held in its sitting position by said limiting means.

6. A reclining article of furniture comprising: a support, a back-rest pivotally mounted on said support, a seat, the rear portion of said seat being swingably mounted on said support, a controlling link, said controlling link being swingably mounted on said support at a point spaced from said pivotal connection between the back-rest and the support and extending upwardly from its pivotal connection with said support, a connecting link, said connecting link being pivoted at its rear end to an intermediate point of said back-rest above the pivotal connection between the back-rest and the support and being pivoted at its front portion to the upper end of said controlling link, a controlling arm extending forwardly, the rear end portion of said controlling arm being fixedly connected with said controlling link, and cooperating abutting surfaces arranged respectively on the forward end portion of said controlling arm and on said seat whereby the movements of the seat are controlled in dependence on movements of the back-rest, said cooperating abutting surfaces being displaceable relative to each other.

7. A reclining article of furniture comprising: a support, a back-rest pivotally mounted on said support, a seat, the rear portion of said seat being swingably mounted on said support, a controlling link, said controlling link being swingably mounted on said support at a point spaced from said pivotal connection between the back-rest and the support and extending upwardly from its pivotal connection with said support, a connecting link, said connecting link being pivoted at its rear end to an intermediate point of said back-rest above the pivotal connection between the back-rest and the support and being pivoted at its front portion to the upper end of said controlling link, a controlling arm extending forwardly, the rear end portion of said controlling arm being fixedly connected with said controlling link, cooperating abutting surfaces arranged on the forward end of said controlling arm and on said seat whereby the movements of the seat are controlled in dependence on movements of the back-rest, said cooperating abutting surfaces being displaceable relative to each other, and means whereby the effective length of said controlling arm may be varied and adjusted.

8. A reclining article of furniture comprising: a support, a back-rest pivotally mounted on said support, a seat, the rear portion of said seat being swingably mounted on said support, a controlling link, said controlling link being swingably mounted on said support at a point spaced from said pivotal connection between the back-rest and the support and extending upwardly from its pivotal connection with said support, a connecting link, said connecting link being pivoted at its rear end to an intermediate point of said back-rest above the pivotal connection between the back-rest and the support and being pivoted at its front portion to the upper end of said controlling link, a controlling arm extending forwardly, the rear end portion of said controlling arm being swingably connected with said controlling link, adjusting means associated with said controlling arm for adjusting and holding same in a predetermined position relative to said controlling link, and cooperating abutting surfaces arranged on the forward end of said controlling arm and on said seat whereby the movements of the seat are controlled in dependence on movements of the back-rest, said cooperating abutting surfaces being displaceable relative to each other.

9. A reclining article of furniture comprising: a support, a back-rest pivotally mounted on said support, a seat, the rear portion of said seat being swingably mounted on said support, a controlling link, said controlling link being swingably mounted on said support at a point spaced from the pivotal connection between the back-rest and the support and extending upwardly from its pivotal connection with said support, a connecting link, said connecting link being pivoted at its rear end to an intermediate point of said back-rest and being pivoted at its front portion to the upper end of said controlling link, a controlling arm extending forwardly, the rear end portion of said controlling arm being fixedly connected with said controlling link, and a roller rotatably arranged on the forward end of said controlling arm for cooperating engagement with said seat whereby the movements of the seat are controlled in dependence on movements of the back-rest.

10. In an article of furniture as claimed in claim 1, a bracket attached to said seat, said means positioned between the front end of said controlling arm and said seat including a roller mounted on the front end of said controlling arm, and said roller being shiftably engaged with said bracket.

11. In an article of furniture as claimed in claim 5, said cooperating stopping means being arranged on said controlling member and on said seat.

12. In an article of furniture as claimed in claim 1, limiting means arranged on the support for limiting the sitting position of the seat, and a bracket attached to said seat, said means positioned between the front end of said controlling arm and said seat including a roller mounted on the front end of said controlling arm, said roller being shiftably engaged with said bracket, and a portion of said bracket being arranged as stopping means for cooperation with said roller so as to prevent the elements of the mechanism including the controlling member, the back-rest and the connecting link from collapsing when the seat is held in its sitting position by said limiting means.

13. In an article of furniture as claimed in claim 1, said controlling arm being fixedly connected with said controlling link at an intermediate point of the latter.

14. In an article of furniture as claimed in claim 1, said means positioned between the front end of said controlling arm and said seat including a controlling rod, one end portion of said controlling rod being pivoted to said controlling arm, the other end portion of said controlling rod being pivoted to said seat so as to effect movement of said seat in coordination with said controlling arm.

15. In an article of furniture as claimed in claim 2, said means positioned between the forward extension of said controlling member and said seat including a controlling rod, one end portion of said controlling rod being pivoted to said controlling member, the other end portion of said controlling rod being pivoted to said seat so as to effect movement of said seat in coordination with said controlling member.

16. In an article of furniture as claimed in claim 1, said means positioned between the front end of said controlling arm and said seat including a controlling rod, one end portion of said controlling rod being pivoted to said controlling arm, the other end portion of said controlling rod being pivoted to said seat so as to effect movement of said seat in coordination with said controlling arm, an extension rigidly connected with said controlling arm, a leg-rest swingably mounted on the front portion of said seat, and a controlling bar pivoted at one of its ends to said extension and at its other end to said leg-rest.

ANTON LORENZ.

REFERENCES CITED

The following references are of record in the file of this patent:

UNITED STATES PATENTS

| Number | Name | Date |
|---|---|---|
| 516,110 | Pynchon | Mar. 6, 1894 |
| 847,880 | Barker et al. | Mar. 19, 1907 |
| 1,028,548 | Cromer | June 4, 1912 |
| 1,846,797 | Decker | Feb. 23, 1932 |
| 2,136,852 | Knauth | Nov. 15, 1938 |